(12) United States Patent
Dettinger et al.

(10) Patent No.: US 7,698,441 B2
(45) Date of Patent: Apr. 13, 2010

(54) INTELLIGENT USE OF USER DATA TO PRE-EMPTIVELY PREVENT EXECUTION OF A QUERY VIOLATING ACCESS CONTROLS

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/264,243

(22) Filed: Oct. 3, 2002

(65) Prior Publication Data
US 2004/0068661 A1 Apr. 8, 2004

(51) Int. Cl.
*G06F 15/16* (2006.01)

(52) U.S. Cl. .................. 709/229; 709/227; 713/152; 726/20

(58) Field of Classification Search ................. 713/200, 713/152; 707/9; 709/229, 227; 726/20
See application file for complete search history.

(56) References Cited

U.S. PATENT DOCUMENTS

| | | | |
|---|---|---|---|
| 5,023,765 A | 6/1991 | Barton | |
| 5,204,961 A | 4/1993 | Barlow | |
| 5,335,346 A | 8/1994 | Fabbio | |
| 5,355,474 A | 10/1994 | Thuraisngham et al. | |
| 5,481,700 A | 1/1996 | Thuraisingham | |
| 5,560,008 A | 9/1996 | Johnson et al. | |
| 5,572,673 A | 11/1996 | Shurts | |
| 5,577,209 A | 11/1996 | Boyle et al. | |
| 5,751,949 A | 5/1998 | Thomson et al. | |
| 5,768,532 A | 6/1998 | Megerian | |
| 5,859,966 A | 1/1999 | Hayman et al. | |
| 5,933,497 A | 8/1999 | Beetcher et al. | |
| 6,112,181 A | 8/2000 | Shear et al. | |
| 6,141,754 A * | 10/2000 | Choy | 713/200 |
| 6,226,745 B1 * | 5/2001 | Wiederhold | 713/200 |
| 6,236,996 B1 * | 5/2001 | Bapat et al. | 707/9 |
| 6,272,488 B1 | 8/2001 | Chang et al. | |
| 6,487,552 B1 * | 11/2002 | Lei et al. | 707/4 |
| 6,516,315 B1 * | 2/2003 | Gupta | 707/9 |
| 6,578,037 B1 * | 6/2003 | Wong et al. | 707/10 |
| 6,745,332 B1 | 6/2004 | Wong et al. | |
| 2002/0010867 A1 | 1/2002 | Schaefer et al. | |

OTHER PUBLICATIONS

Oracle White Paper, "Technical Comparison of Oracle Database vs. IBM DB2 UDB: Focus on Security", Feb. 2002.
Oracle White Paper, "The Virtual Private Database in Oracle9iR2, Understanding Oracle9i Security for Service Providers", Jan. 2002.

* cited by examiner

*Primary Examiner*—George C Neurauter, Jr.
*Assistant Examiner*—Kyung H Shin
(74) *Attorney, Agent, or Firm*—Patterson & Sheridan, LLP (57) ABSTRACT

A system, method and article of manufacture are provided for securing data. Security rules are defined for fields and/or field values. The security rules specify one or more users to which the rules apply. A query is examined for content and a determination is made as to whether security action is required based on the content (e.g., a field and/or a value of the field) and user-specific data.

7 Claims, 8 Drawing Sheets

INTELLIGENT USE OF USER DATA TO PRE-EMPTIVELY PREVENT EXECUTION OF A QUERY VIOLATING ACCESS CONTROLS

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One significant issue in the context of databases is security. Databases often contain confidential or otherwise sensitive material which require a degree of security to be protected from access. For example, medical records are considered highly personal and confidential. As such, access to medical records is typically restricted to selected users. To this end, conventional database management systems may implement user profiles which specify a level of authority. Whether a user may access some particular data will depend upon the user's level of authority specified in their respective profile.

However, the foregoing approach is highly inflexible and static. Data, on the other hand, is highly dynamic (i.e. changes over time). As a result, the security imposed upon a user of conventional databases may, or may not, be appropriate with respect to the data the user is attempting to access. For example, consider a user attempting to access HIV test results. It may be desirable to prevent the user from accessing the HIV test results only if the user's own medical record reflects that the user has had an HIV test, regardless of the value (i.e., positive or negative). If, during a first attempted access, the user's medical record does not reflect an HIV test, the user is allowed to query medical records for HIV test results. If the same user subsequently has an HIV test, which is then reflected in the user's medical record, subsequent attempts to access HIV test results would be disallowed. Alternatively, it may be desirable to prevent the user from accessing HIV test results only if the user's own medical record reflects a positive HIV test result. In either case, conventional database management systems do not allow for this level of flexibility.

Therefore, there is a need for improved security mechanisms for databases.

SUMMARY OF THE INVENTION

The present invention generally is directed to a method, system and article of manufacture for database security.

In one embodiment, a method of providing security with respect to data is provided. The method includes receiving a query issued against a database by a user, wherein the query is configured with at least one field and an associated value for the at least one field; and based upon the existence of data specific to the user for the at least one field, determining whether a security rule specified for the user for the at least one field must be invoked.

Another method of providing security with respect to data includes generating at least one security list reflecting each of a plurality of fields for which data exists for a given user, wherein each of the plurality of fields has a defined security rule for the given user; receiving a query issued against a database by the given user, wherein the query is configured with at least one field and an associated value for the at least one field; accessing the at least one security list to determine whether the at least one field of the query is reflected in the at least one security list; and if the at least one field of the query is reflected in the at least one security list, enforcing the security rule.

In another embodiment, a method of providing security to data having a particular physical data representation includes providing a query specification comprising a plurality of logical fields for defining abstract queries; providing mapping rules which map the plurality of logical fields to physical entities of the data; providing user-specific security rules for the plurality of logical fields; receiving an abstract query issued against the data by a user, wherein the abstract query is defined according to the query specification and is configured with at least one logical field and an associated value for the at least one logical field; and based upon the existence of data specific to the user for the at least one logical field, determining whether a security rule specified for the user for the at least one logical field must be invoked.

Yet another embodiment provides a computer-readable medium containing security validation instructions which, when executed, performs a security validation operation comprising receiving a query issued against a database by a user, wherein the query is configured with at least one field and an associated value for the at least one field; and based upon the existence of data specific to the user for the at least one field, determining whether a security rule specified for the user for the at least one field must be invoked.

Still another embodiment provides a computer-readable medium containing security validation instructions which, when executed, performs a security validation operation. The security validation operation includes generating at least one security list reflecting each of a plurality of fields for which data exists for a given user, wherein each of the plurality of fields has a defined security rule for the given user; receiving a query issued against a database by the given user, wherein the query is configured with at least one field and an associated value for the at least one field; accessing the at least one security list to determine whether the at least one field of the query is reflected in the at least one security list; and if the at least one field of the query is reflected in the at least one security list, enforcing the security rule.

Still another embodiment provides a computer-readable medium, comprising information stored thereon, the information comprising a query specification comprising a plurality of logical fields for defining abstract queries; a plurality of mapping rules which map the plurality of logical fields to physical entities of data; a plurality of user-specific security rules for the plurality of logical fields; a runtime component executable to perform a security validation operation in response to receiving an abstract query issued against the data by a user, wherein the abstract query is defined according to the query specification and is configured with at least one logical field and an associated value for the at least one logical field. The security validation operation includes, based upon the existence of data specific to the user for the at least one logical field, determining whether a security rule specified for the user for the at least one logical field must be invoked.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

The present invention generally is directed to a system, method and article of manufacture for restricting access to data. In general, data access is restricted according to an association between the data being requested in a query and the user issuing the query.

In one embodiment, security rules are implemented as part of a logical model of data. The logical model is implemented as a data repository abstraction layer, which provides a logical view of the underlying data repository. In this way, data is made independent of the particular manner in which the data is physically represented. A query abstraction layer is also provided and is based on the data repository abstraction layer. A runtime component performs translation of an abstract query into a form that can be used against a particular physical data representation.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

Figure 1:
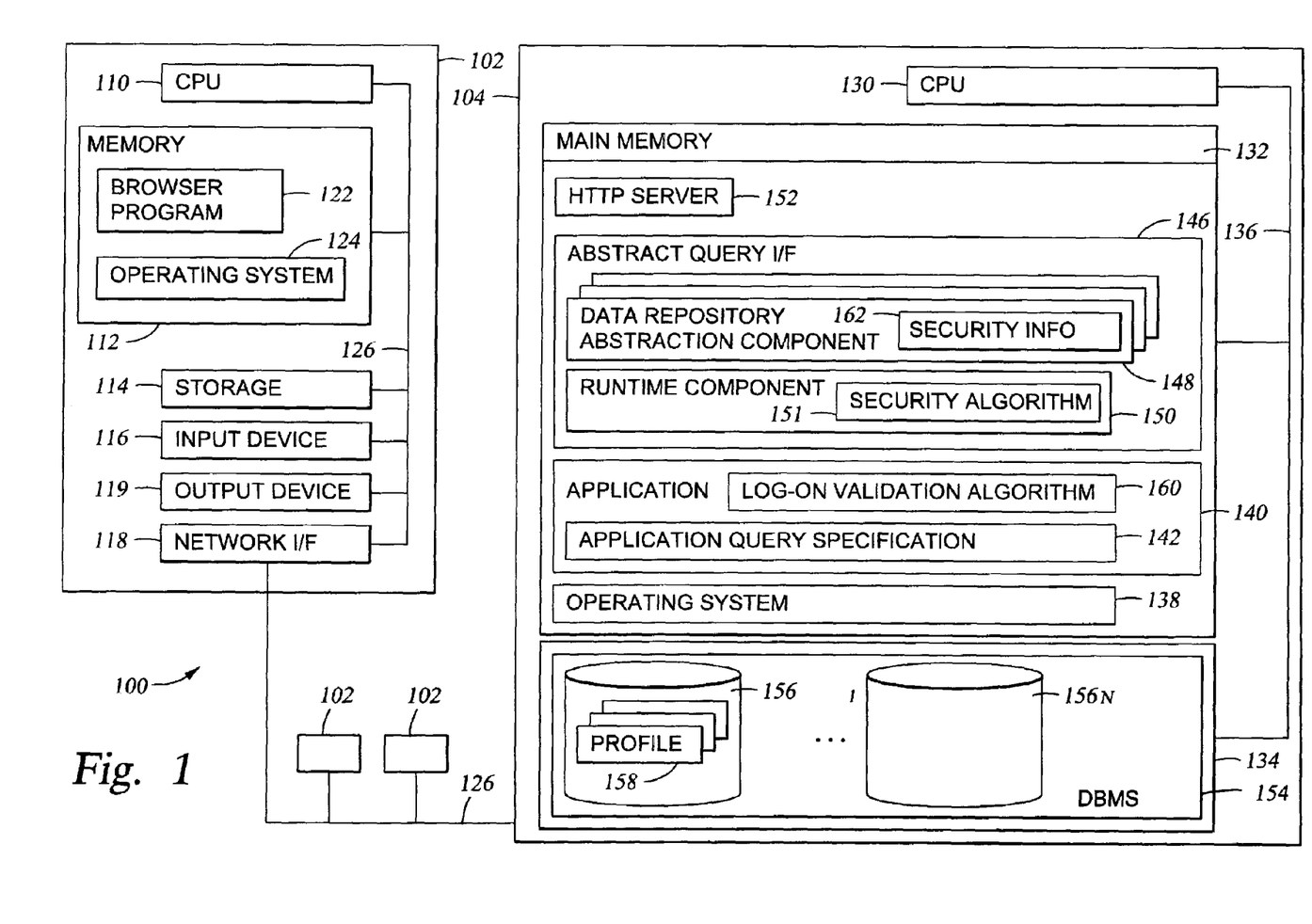
FIG. 1 is one embodiment of a computer system.

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touchscreen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any program (preferably GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1$ . . . $156_N$, collectively referred to as database(s) 156). Illustratively, the databases 156 are shown as part of a database management system (DBMS) in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed/executed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154.

In one embodiment, the data repository abstraction component 148 is configured with security information 162. The security information 162 generally includes security rules which define a user or users' access privileges to selected data. The runtime component 150 operates to enforce the security information 162 according to the particular user issuing a query and the particular data to be accessed/returned by execution of the query. In general, security rules may be defined for a particular user, a group of users or all users. Whether or not a user has an association with one or more other users is defined in a profile 158. Accordingly, a profile 158 may exist for each user attempting to access the databases 156.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

Logical/Runtime View of Environment

Figure 2A:
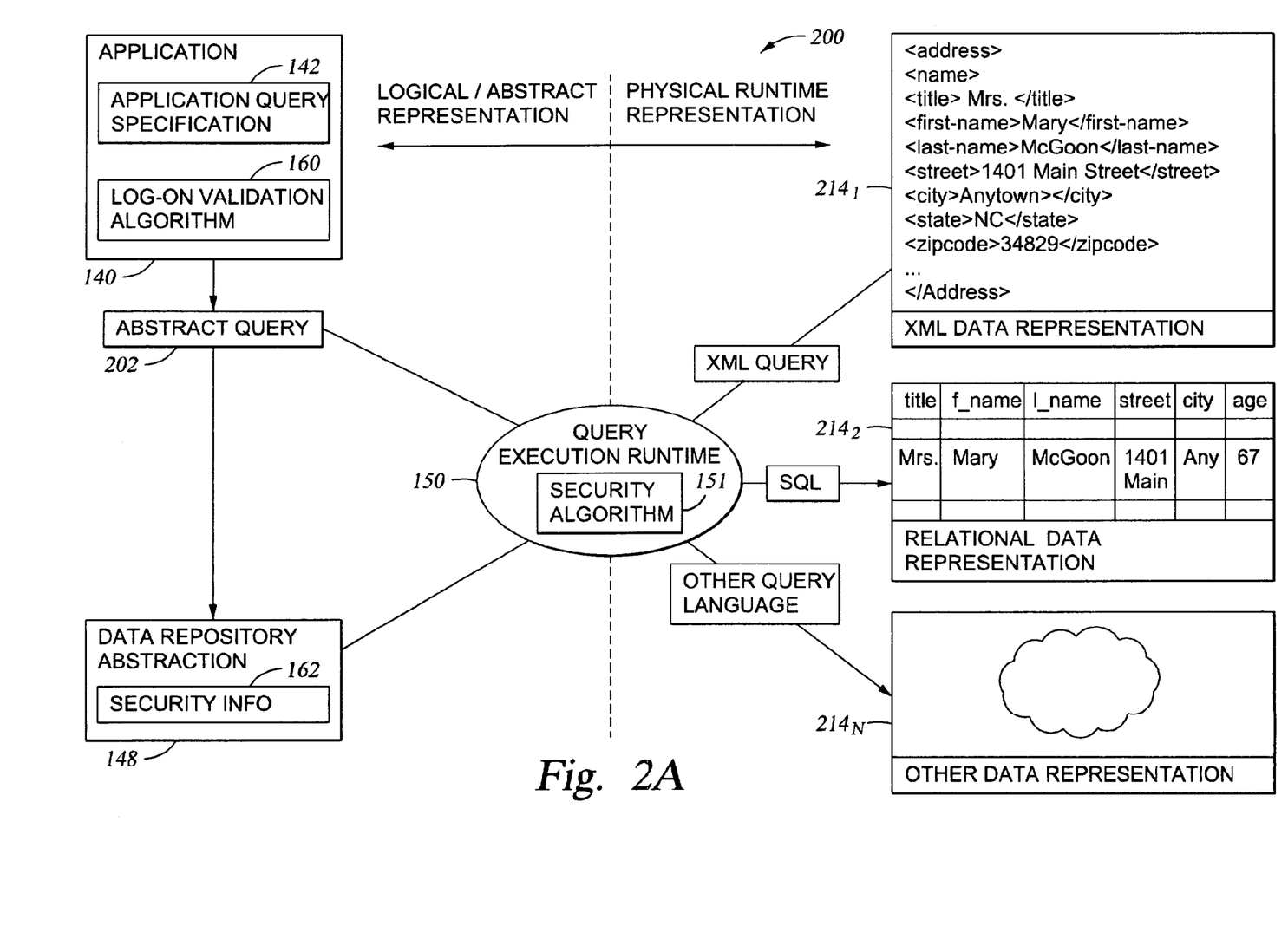
FIG. 2A is a logical/physical view of software components of one embodiment of the invention.
Figure 2B:
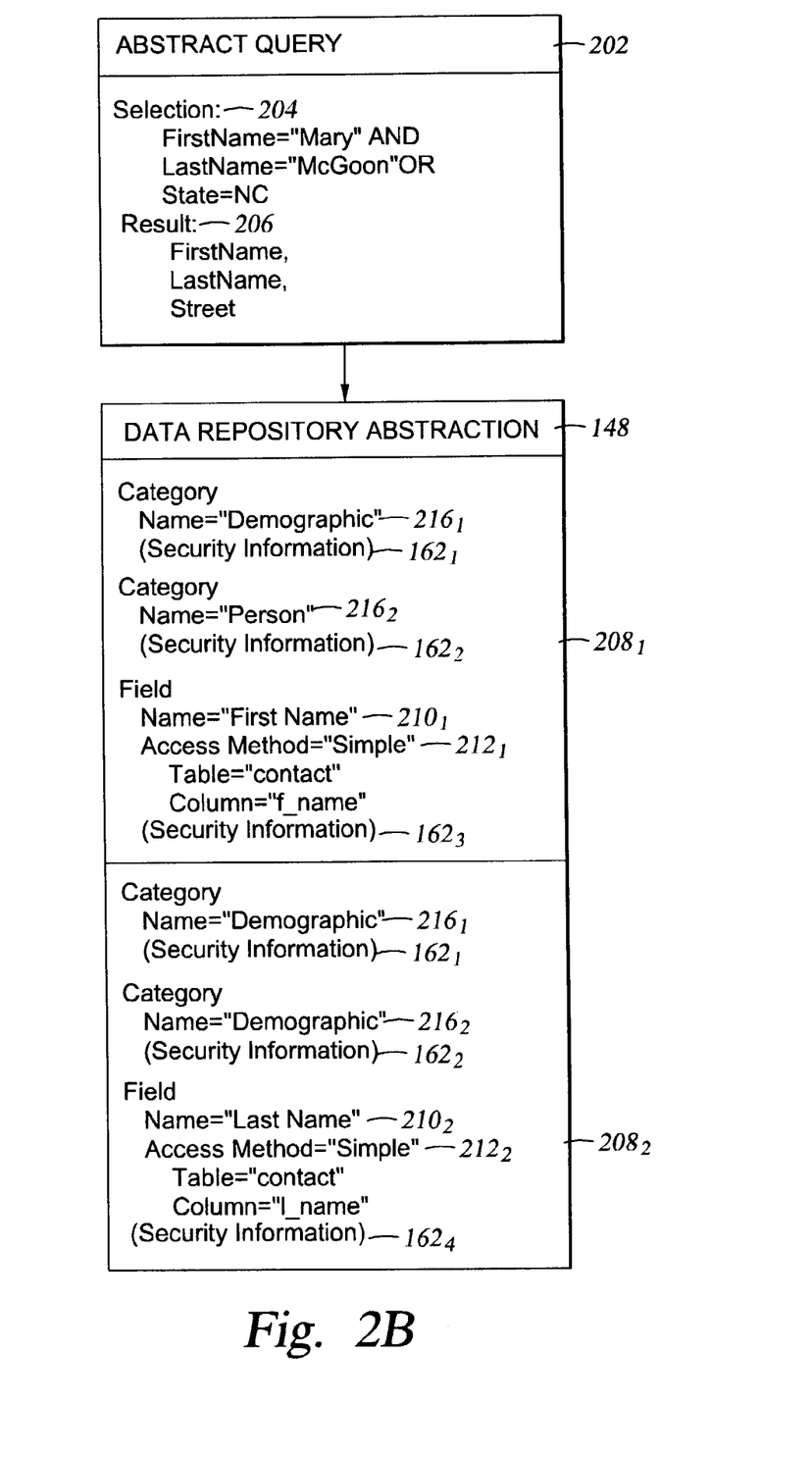
FIG. 2B is a logical view of an abstract query and a data repository of abstraction.

FIGS. 2A-B show an illustrative relational view 200 of components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

An illustrative abstract query corresponding to the abstract query 202 shown in FIG. 2B is shown in Table I below. By way of illustration, the abstract query 202 is defined using XML. However, any other language may be used to advantage.

comprises a logical field name $210_1$, $210_2$ (collectively, field name 210) and an associated access method $212_1$, $212_2$ (collectively, access method 212). In the illustrative embodiment field specifications 208 also include one or more category names $216_1$, $216_2$ (collectively, category names 216). The category names associate a group of logical field names. For example, in FIG. 2B both field specifications $208_1$ and $208_2$ specify a demographic category $216_1$ and a person category $216_2$. However, the use of categories is merely representative of a particular embodiment, and other embodiments do not utilize categories.

The access methods 212 associate (i.e., map) the logical field names to a particular physical data representation $214_1$, $214_2 \ldots 214_N$ in a database (e.g., one of the databases 156). By

TABLE I

QUERY EXAMPLE

```
001    <?xml version="1.0"?>
002    <!--Query string representation: (FirstName = "Mary" AND LastName =
003    "McGoon") OR State = "NC"-->
004    <QueryAbstraction>
005        <Selection>
006            <Condition internalID="4">
007                <Condition field="FirstName" operator="EQ" value="Mary"
008    internalID="1"/>
009                <Condition field="LastName" operator="EQ" value="McGoon"
010    internalID="3"relOperator="AND"></Condition>
011            </Condition>
012            <Condition field="State" operator="EQ" value="NC" internalID="2"
013    relOperator="OR"></Condition>
014        </Selection>
015        <Results>
016            <Field name="FirstName"/>
017            <Field name="LastName"/>
018            <Field name="State"/>
019        </Results>
020    </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 (which may be in response to user input query conditions) to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 comprises a plurality of field specifications $208_1$, $208_2$, ... (two shown by way of example), collectively referred to as the field specifications 208. Specifically, a field specification is provided for each logical field available for composition of an abstract query. In one embodiment, a field specification 208 way of illustration, two data representations are shown in FIG. 2A, an XML data representation $214_1$ and a relational data representation $214_2$. However, the physical data representation $214_N$ indicates that any other data representation, known or unknown, is contemplated.

In one embodiment, a single data repository abstraction component 148 contains field specifications (with associated access methods) for two or more physical data representations 214. In an alternative embodiment, a different single data repository abstraction component 148 is provided for each separate physical data representation 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148.

Any number of access methods are contemplated depending upon the number of different types of logical fields to be supported. In one embodiment, access methods for simple fields, filtered fields and composed fields are provided. The field specifications $208_1$ and $208_2$ exemplify simple field access methods $212_1$ and $212_2$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". Filtered fields (no example shown in FIG. 2) identify an associated physical entity and provide rules used to define a particular subset of items within the physical data representation. An example of a filtered field is a New York ZIP code field that maps to the physical representation of ZIP codes and restricts the data only to those ZIP codes defined for the state of New York. Composed access methods (no example shown in FIG. 2) compute a logical field from one or more physical fields using an expression supplied as part of the access method definition. In this way, information which does not exist in the underlying data representation may computed. An example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

In one embodiment, one or more of the field specifications 208 are configured with the security information 162 briefly described above with reference to FIG. 1. In the illustrated embodiment, both the category definitions and the field definitions have associated security information 162. However, it should be understood that not all category definitions and all field definitions need necessarily include security information. Because the categories define associations between two or more logical fields, logical fields belonging to the same category inherit the same categorical security information. For example, the field specifications $208_1$ and $208_2$ each belong to the Demographic category $216_1$ and the Person category $216_2$ and, accordingly, inherit the respective security information $162_1$ and $162_2$.

Additional aspects of the security information 162 can be described with reference to Table II, which shows an illustrative Data Repository Abstraction component corresponding to the data repository abstraction component 148 shown in FIG. 2B. By way of illustration, the Data Repository Abstraction 148 is defined using XML. However, any other language may be used to advantage.

TABLE II

DATA REPOSITORY ABSTRACTION EXAMPLE

```
001    <?xml version="1.0"?>
002    <DataAbstraction version="1.0"
003    xmlns:xsi="http://www.w3.org/2001/XMLSchema-instance"
004    xsi:noNamespaceSchemaLocation="DataAbstraction.xsd">
005
006    <Category name="Person">
007
008        <Security type="value">
009            <SecurityRule>
010                <User>All</User>
011                <Action> NoRunAndLog</Action>
012            </SecurityRule>
013        </Security>
014
015    <Field name="First Name">
016            <AccessMethod>
017                    <Simple attrName="FNAME" entityName="PERSONINFO"/>
018            </AccessMethod>
019            <Type baseType="char"></Type>
020    </Field>
021
022    <Field name="Last Name">
023            <AccessMethod>
024                    <Simple attrName="LNAME" entityName="PERSONINFO" />
025            </AccessMethod>
026            <Type baseType="char"></Type>
027    <Security type="value">
028            <SecurityRule>
029                    <User>All</User>
030                    <Action> RunAndLog</Action>
031            </SecurityRule>
032            <SecurityRule>
033                    <User>securityOfficers </User>
034                    <Action>RunAndLog </Action>
035            </SecurityRule>
036            <SecurityRule>
037                    <User> Mary_McGoon </User>
038                    <Action> NoAction </Action>
```

TABLE II-continued

DATA REPOSITORY ABSTRACTION EXAMPLE

```
039              </SecurityRule>
040          </Security>
041      </Field>
042   </Category>
043
044   <Category name="Test">
045   <Field name="HIV Test">
046          <AccessMethod>
047              <Simple attrName="RESULTS" entityName="TESTS"/>
048          </AccessMethod>
049          <Type baseType="char"></Type>
050       <Security type="access">
051          <SecurityRule>
052              <User>All</User>
053              <Action> RunAndLog</Action>
054          </SecurityRule>
055          <SecurityRule>
056              <User> securityOfficers </User>
057              <Action>RunAndLog </Action>
058          </SecurityRule>
059          <SecurityRule>
060              <User> MaryMcGoon </User>
061              <Action> LogAndDoNotRun </Action>
062          </SecurityRule>
063       </Security>
064      </Field>
065   </Category>
066   </DataRepository>
```

As can be seen from Table II, the security information associated with each category definition and field definitions generally comprises a security type and a security rule. The security rule specifies the user or users to which the rule applies and a particular action to be taken when the rule is invoked. Illustrative actions include preventing execution of the query and logging the attempt, executing the query and logging the execution, or taking no action. Of course, other actions are contemplated.

In one embodiment, the security type may be a "value" type, an "access" type or both. In the present example, the "Last Name" field definitions illustrate a value type security and the "HIV Test" field definitions illustrate an access type security. As defined herein, a value type security rule restricts access based on user-specific information and a particular field value (examples of field values include Mary, McGoon, 1111 Easy Street). In comparison, access type security rules restrict any access based on a user and a field type, regardless of the field value (examples of field types include first name, last name, address). For purposes of illustration, consider a "last name" field. Assume that it is desirable to prevent users from accessing their own last names, but not any other last names. In this case, a value type security rule is implemented for the "last name" field for all users, as has been done in the exemplary data repository abstraction of Table II. (See, lines 028-031.) By adding the security information in this manner, the run-time component 150 is made aware (at runtime) that a predefined security algorithm 151 (FIG. 1) must be implemented when a user attempts to access the "last name" field. Aspects of the runtime component are describe in more detail below.

As another illustration consider the case of a "HIV Test" field. Given the broad sensitivity of information contained in this field, it may be desirable to prevent particular users from accessing the field altogether. For example, it may be desirable to prevent users who are themselves HIV-positive from accessing the "HIV Test" field. In this case, the security information includes an access type security restriction. (See lines 045-064.) During runtime, the security algorithm 151 of the run-time component 150 determines whether a user attempting to access the "HIV Test" field is restricted from doing so or, more generally, whether some security action must be taken (according to whether the user is HIV-positive). Accordingly, for an access type restriction, the particular value in the "HIV Test" field being requested is irrelevant.

As illustrated by the logical "last name" field in Table II (Lines 022-041), security information for a given field/category definition may include more than one security rule. In particular, a different security rule may be provided for different classes of users. The definition for the logical "last name" field illustrates a first security rule for all users, a second security rule for a group of users, and a third security rule for a singular user. In one embodiment, a best-fit algorithm (which may be part of the application 140 (FIG. 1)) is used to determine which restrictions are placed on a particular user class. For example, if user Mary_McGoon attempts to access the "last name" field, the rule for the user profile Mary_McGoon is used. The rules for "all" users and for "security officers" are ignored because a more exact rule specification was found (i.e., the security rule specific to user Mary_McGoon).

However, in one embodiment, the rule determined by the best-fit algorithm may be overridden. As evidenced by Table II, the data repository abstraction component 148 may have a hierarchical tree structure. In the illustrative data repository abstraction of Table II, the highest node represented is the demographic category. The next highest node is the person category, which has as children the first name field and the last name field. Accordingly, in one embodiment, the strictest rule is that rule associated with the highest node in the tree. In this example, the strictest rule is the rule associated with the security information of the demographic category. Therefore, the security rule specific to user Mary_McGoon may be overridden by the rule of the demographic category.

Figure 3:
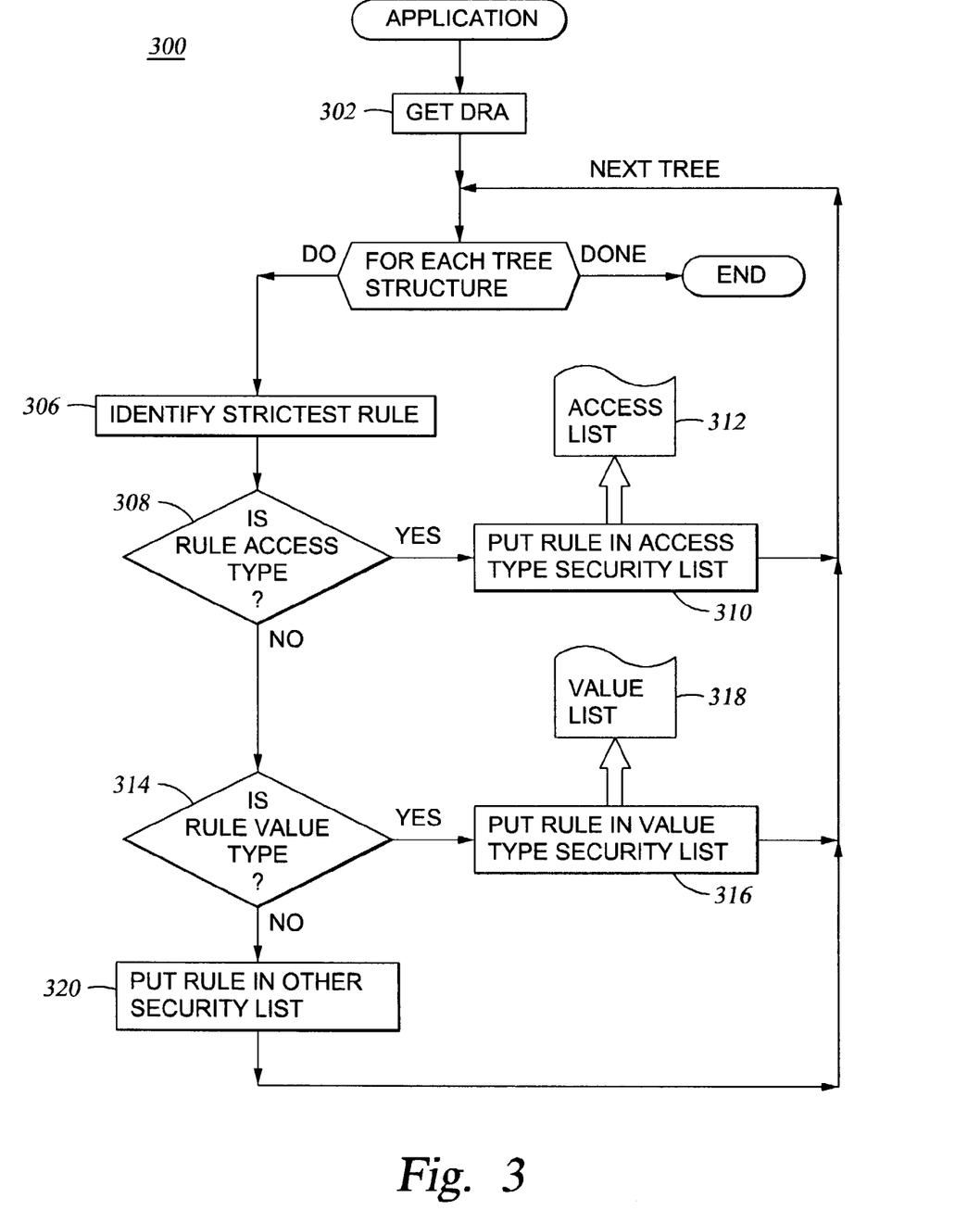
FIG. 3 is a flowchart illustrating the initiation and operation of an application.

Referring now to FIG. 3, a method 300 is shown illustrating an initial program load and operation of the application 140. The method is entered upon initiation of the application 140 (e.g., by an administrator). At step 302, a data repository abstraction component is loaded/retrieved. In one embodiment in which multiple data repository abstraction component are available, the data repository abstraction component to be retrieved is specified by the application 140. At step 304, a loop is entered for each tree structure of the data repository abstraction component. At step 306, the strictest rule in the tree structure is identified. This is done by "walking" up the tree from the lowest node to the highest node, and identifying the highest node having an associated security rule. Once the strictest rule is identified, the application 140 determines (at step 308) whether the rule is an access type. If so, the field associated with the rule is placed in a user specific access type security list 312 at step 310. The method 300 then returns to step 304 to begin processing for the next tree structure in the data repository abstraction component.

If step 308 is answered negatively, processing proceeds to step 314 where the method 300 determines whether the rule is a value type rule. If so, the field associated with the rule is placed in a user specific value type security list 318 at step 316. The method 300 then returns to step 304 to begin processing for the next tree structure in the data repository abstraction component.

If step 314 is answered negatively, processing proceeds to step 320 where the field associated with the rule is placed in the appropriate security list. Step 320 represents the extension of the method 300 to other types of security rules. The method 300 then returns to step 304 to begin processing for the next tree structure in the data repository abstraction component.

Method 300 continues until each tree structure in the data repository abstraction component has been processed. The application 140 is then ready to begin accepting requests.

Figure 4:
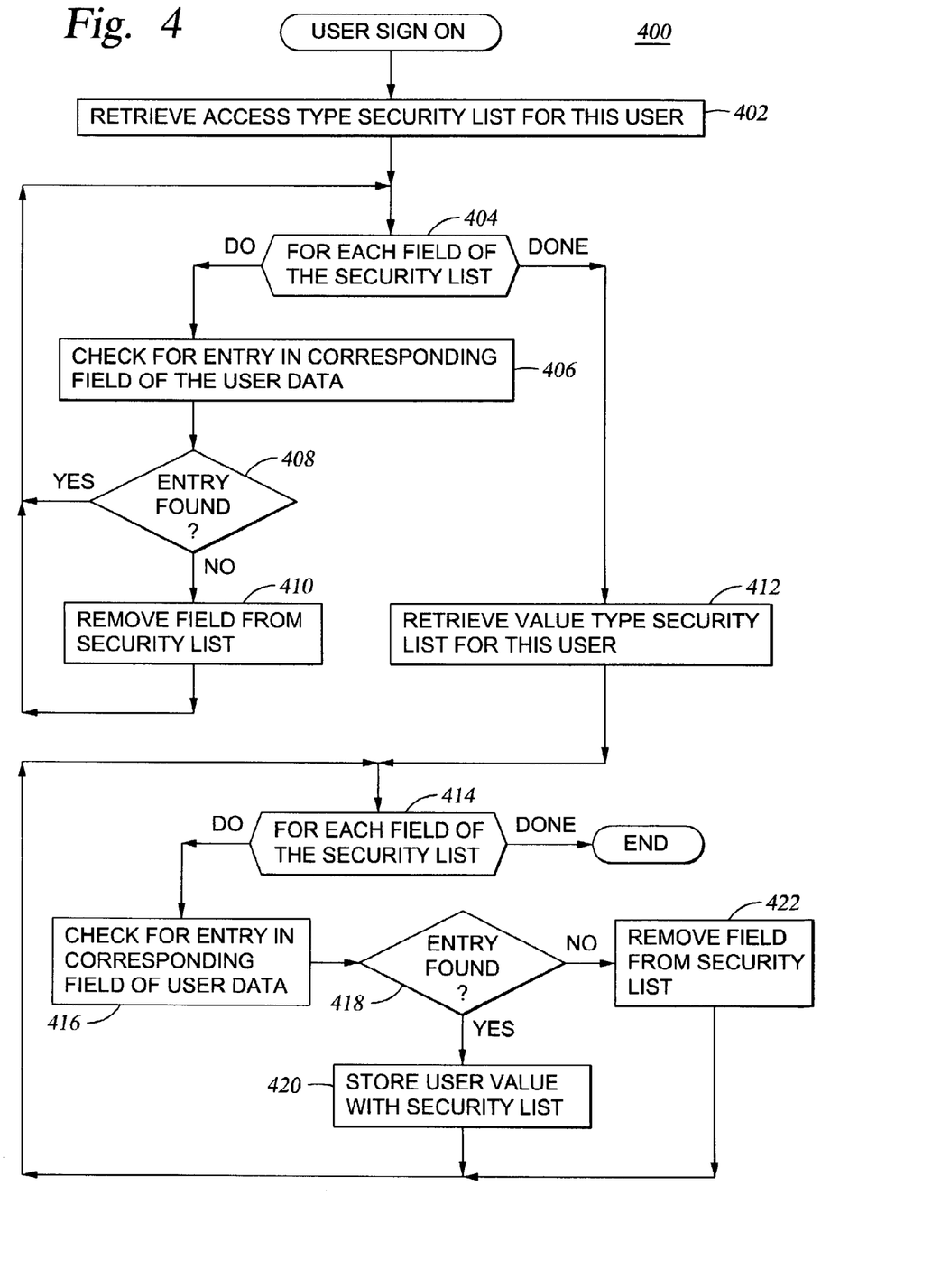
FIG. 4 is a flowchart illustrating a user logon validation sequence.

FIG. 4 shows one embodiment of a logon validation method 400 which is performed by the logon validation algorithm 160 of the application 140. The logon validation method 400 is performed each time a user signs on to use the application 140. At step 402, the logon validation algorithm 160 retrieves the access type security list 312 for the user signing on. At step 404, the validation method 400 initiates a loop for each field of the security list 312. At step 406, the validation algorithm 160 checks for an entry in the corresponding field (i.e., the field corresponding to the security list field being processed) of the user data (i.e. in the physical data of the database 156). If a corresponding entry is not found (step 408), the field being processed is removed from the security list 312. In this way, the removed field will not be considered for security purposes during run-time. If a corresponding field is found (step 408), no specific action need be taken and processing returns to step 404 to begin processing the next field of the security list 312. Once each field of the security list 312 has been processed, the logon validation method 400 proceeds to step 412.

At step 412, the value type security list 318 for the user signing on is retrieved. A loop performed for each field of the security list is entered at step 414. At step 416, the validation algorithm 160 checks for an entry in the corresponding field (i.e., the field corresponding to the security list field being processed) of the user data (i.e. in the physical data of the database 156). If a corresponding entry is not found (step 418), the field being processed is removed from the security list 318. Otherwise (i.e. if an entry is found at step 418), the value of the corresponding user specific entry is stored with the value type security list 318 (or in some other security data structure). In either case, processing returns to step 414.

When each field of the security list 318 has been processed the logon validation algorithm 160 exits, and the user may now start issuing queries.

Figure 5A:
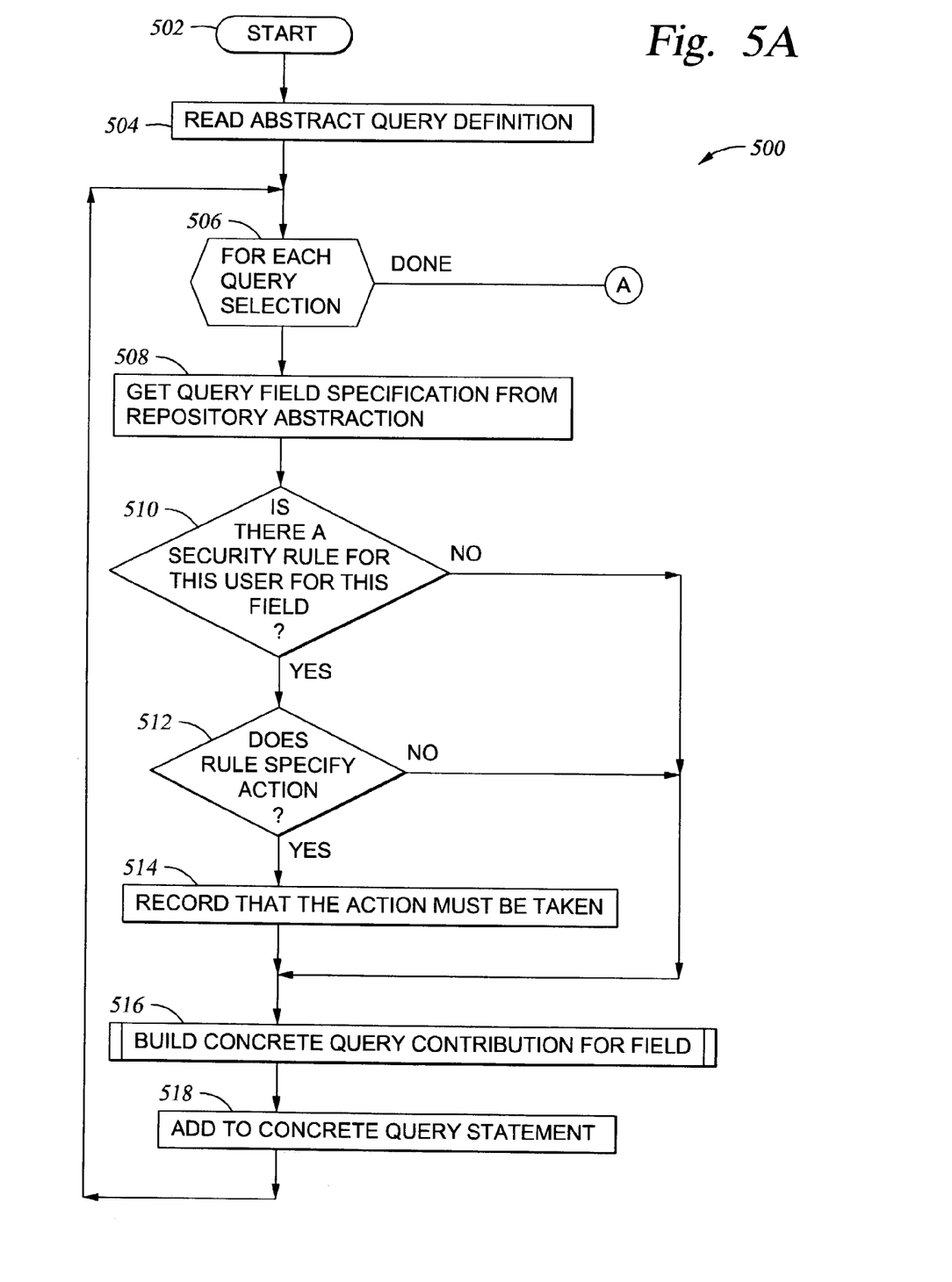
FIG. 5 is a flow chart illustrating the operation of a runtime component.
Figure 5B:
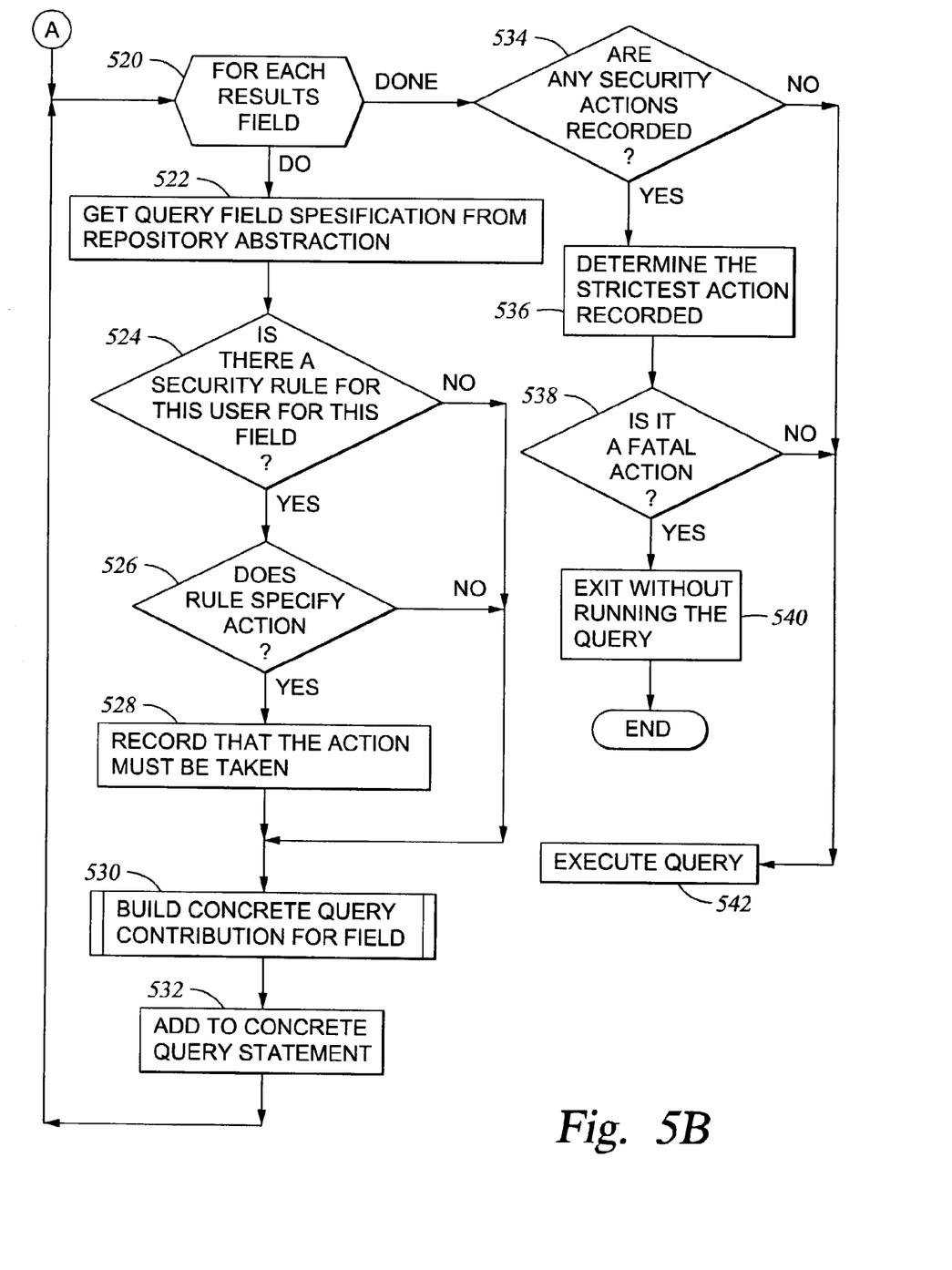

FIG. 5 shows an illustrative runtime method 500 exemplifying one embodiment of the operation of the runtime component 150. In particular, aspects of the runtime method 500 may be implemented by the security algorithm 151 (FIG. 1). The method 500 is entered at step 502 when the runtime component 150 receives as input an instance of an abstract query (such as the abstract query 202 shown in FIG. 2). At step 504, the runtime component 150 reads and parses the instance of the abstract query and locates individual selection criteria and desired result fields. At step 506, the runtime component 150 enters a loop for processing each query selection criterion statement present in the abstract query, thereby building a data selection portion of a Concrete Query. In one embodiment, a selection criterion consists of a field name (for a logical field), a comparison operator (=, >, <, etc) and a value expression (what is the field being compared to). At step 508, the runtime component 150 uses the field name from a selection criterion of the abstract query to look up the specification of the field in the data repository abstraction 148. As noted above, the field specification includes a definition of the access method used to access the physical data associated with the field. In addition, the field specification may include security information 162. Accordingly, the runtime component 150 determines (step 510) whether there is a security rule for this particular user (i.e., the user issuing the query) for the retrieved query field specification. That is, the runtime component 150 references the access type security list 312 and the value type security list 318 to determine the presence of a field name corresponding to the field specification. If no security rule for the field specification is found in either list, processing proceeds to step 516. If a security rule does exist, the runtime component 150 determines (step 512) whether a security action specified by the rule must be taken. In the case of an access type restriction, a rule-specified security action must be taken if a field entry corresponding to the logical field of the field specification was found in the access type security list 312 at step 510, regardless of the value of the field entry. In the case of a value type restriction, a rule-specified security action must be taken if a field value corresponding to the logical field value in the logical query component/criterion being analyzed was found in the value type security list 318 at step 510. If step 512 is answered affirmatively, the runtime component 150 records (at step 514) that the action must be taken. Processing then proceeds to step 516.

The runtime component 150 then builds (step 516) a Concrete Query Contribution for the logical field being processed. As defined herein, a Concrete Query Contribution is a portion of a concrete query that is used to perform data selection based on the current logical field. A concrete query is a query represented in languages like SQL and XQuery and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added (step 518) to a Concrete Query Statement. The method 500 then returns to step 506 to begin processing for the next field of the abstract query. Accordingly, the process entered at step 506 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. In one embodiment, a result specification also include security information 162, which may be defined identically to or similarly to the security information described above with reference to Table II. To handle result specifications, the method 500 enters a loop at step 520 to add result field definitions to the concrete query being generated. At step 522, the runtime component 150 looks up a result field name (from the result specification of the abstract query) in the data repository abstraction 148 and then retrieves a Result Field Definition from the data repository abstraction 148 to identify the physical location of data to be returned for the current logical result field. At step 524, the runtime component 150 determines whether a security rule exists for this particular user for the particular result field definition being processed. That is, the runtime component 150 references the access type security list 312 to determine the presence of a field name corresponding to the result specification (the value type security list 318 is not checked because, for results, no value is available). If no security rule for the result specification is found in the list 312, processing proceeds to step 530. Otherwise, the runtime component 150 determines (step 526) whether the rule defined for the result field specifies an action that must be taken. This may be performed in a manner similar to that described with reference to step 512. If step 526 is answered affirmatively, the runtime component 150 records (step 528) that the action must be taken. In either case, processing proceeds to step 530.

At step 530, the runtime component 150 builds (at step 530) a Concrete Query Contribution (of the concrete query that identifies physical location of data to be returned) for the logical result field. At step 532, Concrete Query Contribution is then added to the Concrete Query Statement.

Once each of the result specifications in the abstract query has been processed, the runtime component 150 determines (step 534) whether any security actions must be taken (according to whether any actions have been recorded in the manner described above). If not, the query is executed at step 542. However, if security actions must be taken, the recorded actions are reviewed (step 536) to determine the strictest action. In one embodiment, each action is assigned a numerical value, where the values are ascending with increasing strictness. At step 538, the runtime component 150 determines whether the action is fatal (i.e., prevents the query from being executed). If not, the query is executed at step 542. If the action is fatal, the query is not executed and the user is notified of a security violation (step 540). The method 500 then ends.

It should be noted that the above query validation performed by the security algorithm 151 may generally be performed at either of two times. In one embodiment, the validation may occur as each query condition is built. Such an approach would expedite notification to the user of a security violation. A disadvantage of this approach, however, is that it facilitates experimentation (e.g., incrementally modifying the query) by users seeking to subvert the security restrictions in place. Accordingly, an alternative approach performs query validation only once the entire query has been entered and issued by the user. The latter approach also ensures that the runtime component 150 is given a "total picture" of the query prior to checking for violations, thereby making the user's intentions more obvious than a single condition would.

The runtime method 500 for value type restrictions may be illustrated with reference to the above example regarding the "last name" field and the data repository abstraction of Table II. Assuming that the user is Mary McGoon, an entry for the value "McGoon" in the last name column would have been entered in the value type security list 318 during logon (logon validation method 300). Assume now that Mary McGoon issues a logical query which contains the value McGoon in the "last name" field, the runtime component 150 checks (steps 510 and 524) whether either of the access type security list 312 or the value type security list 318 (generated for Mary McGoon when she logged on) contain a security rule for the "last name" field. After determining that the value type security list 318 contains a security rule for the "last name" field, the security algorithm 151 determines (steps 512 and 526) whether the rule requires action in response to the attempted access. In the present example, an action is required since the logical query criterion being analyzed contains the value "McGoon" and the rule is a value type rule specifying action for user Mary McGoon. The action specified by the data repository abstraction component of Table II (and which was recorded in the value type security list 318) is "NoAction". If the attempted access does require action, then the security algorithm 151 records that the action defined in the security information 162 must be taken (steps 514 and 528).

In the present example, a specified security action (which, in the case of Mary McGoon, is no action) is performed when the specified used issues a query with a particular value. Of course, persons skilled in the art will recognize that the security rule logic could also be configured with NOT operators. For example, a security rule may be configured to "RunAndLog" if a user (e.g., Mary McGoon) enters someone else's name in a query, but to take "NoAction" if the same user enters their own name, or vise versa.

Continuing with the example of Mary McGoon, assume that Mary's records indicate that she had an HIV test performed. Accordingly, the access type security list would contain a column for the HIV test field (as a result of the logon validation method 300). Assume further that Mary issues a query referencing the HIV test field.

The runtime component 150 checks (steps 510 and 524) whether either of the access type security list 312 or the value type security list 318 (generated for Mary McGoon when she logged on) contain a security rule for the "HIV Test" field. After determining that the access type security list 312 contains a security rule for the "HIV Test" field, the security algorithm 151 has necessarily determined (steps 512 and 526) that the rule requires action in response to the attempted access. This is because, for access type restrictions, the value of the field specified in the query is irrelevant and, accordingly, the mere existence of the HIV Test field in the access type security list 312 indicates a security rule exists and must be enforced. It should be noted that in each of the present examples, a determination that a rule requires "action" is merely a determination that a rule has been specified and that the conditions for enforcing the rule have been satisfied. Of course, as noted in previous embodiments, the rule may be a "no action" rule (See Table II, line 038, for example) specifying that that "no action" is to be taken. In the present example, the action to be taken is "LogAndDoNotRun".

It should be clear that, in one embodiment, the access type security list 312 and the value type security list 318 are merely provided to enhance performance. In another embodiment, the lists 312, 318 are not used and the runtime component 150 accesses the data repository abstraction component 148 directly in order to validate queries.

Figure 6:
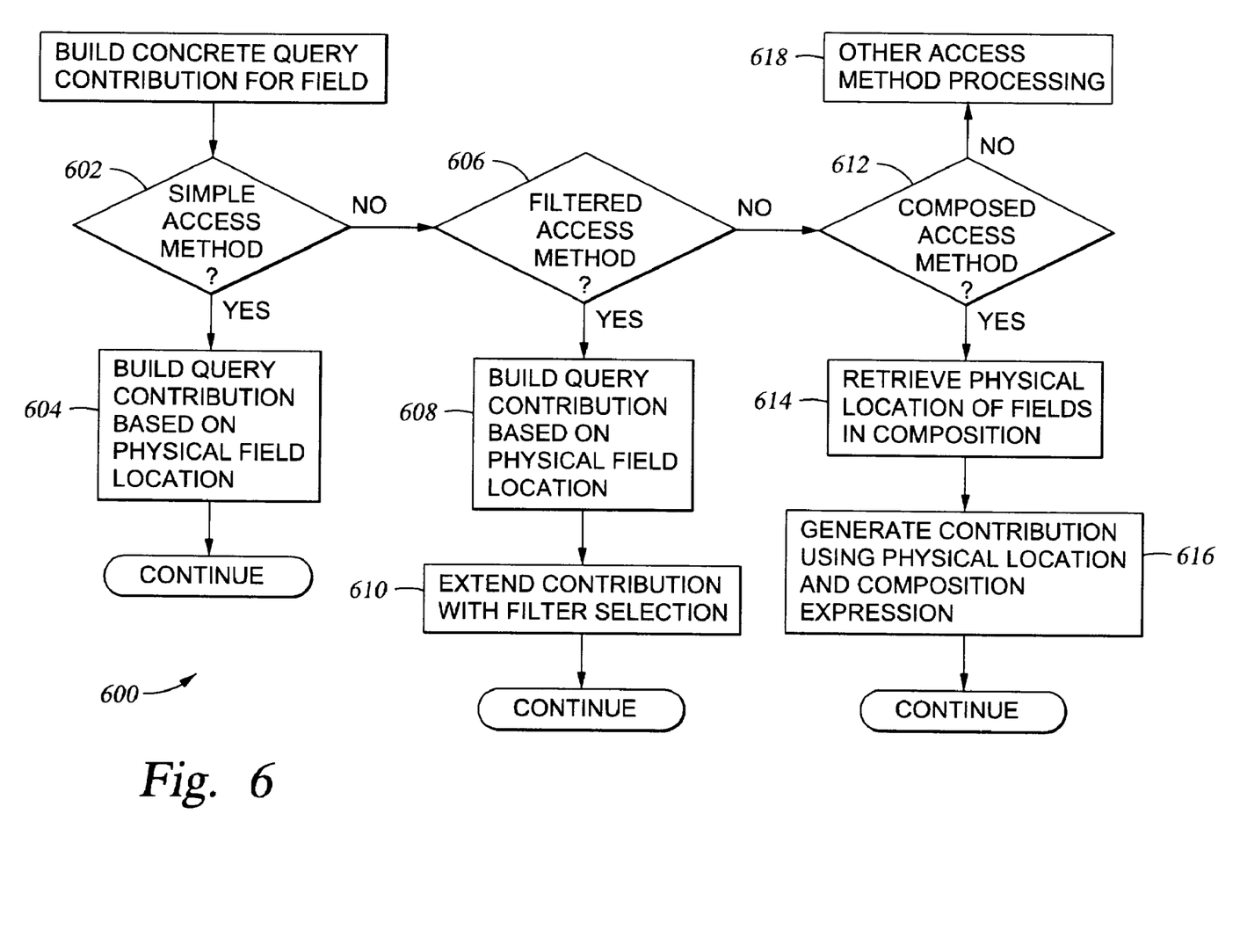
FIG. 6 is a flow chart illustrating the operation of a runtime component.

One embodiment of a method 600 for building a Concrete Query Contribution for a logical field according to steps 516 and 530 is described with reference to FIG. 6. At step 602, the method 600 queries whether the access method associated with the current logical field is a simple access method. If so, the Concrete Query Contribution is built (step 604) based on physical data location information and processing then continues according to method 500 described above. Otherwise, processing continues to step 606 to query whether the access method associated with the current logical field is a filtered access method. If so, the Concrete Query Contribution is built (step 608) based on physical data location information for some physical data entity. At step 610, the Concrete Query Contribution is extended with additional logic (filter selection) used to subset data associated with the physical data entity. Processing then continues according to method 500 described above.

If the access method is not a filtered access method, processing proceeds from step 606 to step 612 where the method 600 queries whether the access method is a composed access method. If the access method is a composed access method, the physical data location for each sub-field reference in the composed field expression is located and retrieved at step 614. At step 616, the physical field location information of the composed field expression is substituted for the logical field references of the composed field expression, whereby the Concrete Query Contribution is generated. Processing then continues according to method 500 described above.

If the access method is not a composed access method, processing proceeds from step 612 to step 618. Step 618 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 600. For example, the conversion may be performed as part of, or immediately following, the steps 604, 608 and 616. A subsequent conversion from the format of the physical data to the format of the logical field is performed after the query is executed at step 542. Of course, if the format of the logical field definition is the same as the underlying physical data, no conversion is necessary.

In the foregoing illustrations, security conditions are premised on establishing an association between a column in a table for a user issuing a query and the same column for another person. That is, for example, a value type restriction requires a comparison between a user-specific value (e.g., last name) and the same value (which the user is attempting to access) for another person. Of course, in other embodiments, security restriction may be extended to include any other "sensitive" information (form the standpoint of the particular user issuing the query). For example, it may be desirable to prevent a user from accessing the last name of a former spouse (s). Exactly which values/fields are restricted may be specified in a security algorithm of the application 140.

In one embodiment, the foregoing aspect of extending security restriction to include any other "sensitive" information may be achieved by field correlation. Field correlation allows security on a particular field to be related to values in another field. For example, the "last name" field may be correlated to an "address" field to retrieve the names of other people currently living at the same address, or at previous addresses, at the same time the user issuing a query lived at the address. Then, given these names, the name history of the user could be checked to generate an extensive list of names, which the user may be prevented from accessing. As another illustration, given genealogical information in a database, rules may be written to walk through a family tree, building a complex list of names over the past N generations (where N is an integer number, for example). As yet another illustration, given a list of a doctor's active patients (readily available from a data warehouse), a degree of security restriction may be imposed upon the doctor for all other names.

As described above, some security actions include logging an attempted access. More generally, persons skilled in the art will recognize that any variety of responses may be taken when a security rule is invoked. For example, a notification (e.g., by e-mail) to a system administrator may be issued.

As noted above, the data repository abstraction component 148 is merely illustrative of one embodiment which provides various advantages. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case where a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

With regard to the end user, the data repository abstraction provides a data filtering mechanism, exposing pertinent data and preventing access to selected content. However, it should be understood that the data repository abstraction is merely one embodiment of the invention. More generally, the invention is implemented in any manner which provides for execution (or non-execution) of a query according to a user-data dependency. That is, query execution is made dependent on the end user and particular data which would be accessed/returned by the query upon execution.

However, it should be emphasized that persons skilled in the art will readily recognize that the security features and mechanisms of the invention may be implemented separately from the data repository obstruction component. For example, in the context of conventional relational databases, one embodiment provides a number of additional database tables to store information associating a table and column to security rules. The security rules are applied to attempts to access information in the table/column. In this case, a security component is responsible for analyzing a query written in a query language (e.g., SQL) and determining the set of security rules that apply, based on the set of tables/columns referenced within query predicates or returned as members of the result set for the specified query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A method of providing security with respect to data, comprising:
    generating at least one security list comprising an entry for each field of the data having an associated security rule;
    for a given user, generating a user specific instance of the at least one security list, the generating comprising:
        a) for each field of each entry in the security list, determining whether data exists for the field that is specific to the given user; and
        b) if not, removing the entry from the security list;
    after generating the user specific instance of the at least one security list, receiving a query issued against a database by the given user, wherein the query is configured with at least one field and an associated value for the at least one field;
    accessing the security list to determine whether the security list contains an entry corresponding to the at least one field of the query; and if the security list contains an entry corresponding to the at least one field of the query, enforcing a security rule associated with the at least one field;
    whereby security rules specified for fields in queries are enforced based upon the existence of data specific to the user for the fields.

2. The method of claim 1, wherein the query is an SQL query.

3. The method of claim 1, further comprising invoking the security rule; wherein invoking the security rule comprises determining whether to execute the query.

4. The method of claim 1, further comprising determining that the security rule must be invoked upon determining the existence of the data specific to the user for the at least one field, regardless of a value of the data specific to the user for the at least one field.

5. The method of claim 1, wherein determining whether the security rule must be invoked comprises determining a match between the associated value for the at least one field and a value of the data specific to the user for the at least one field.

6. The method of claim 1, wherein generating the user specific instance of the at least one security list is performed when the user logs on.

7. A method of providing security with respect to physical data, comprising:
    providing a data abstraction model comprising a plurality of logical field definitions each abstractly describing one or more physical field of the physical data and specifying one or more security rules;
    on the basis of the data abstraction model, generating at least one security list comprising an entry for each logical field definition having an associated security rule;
    for a given user, generating a user specific instance of the at least one security list, the generating comprising:
        a) for each logical field definition having an entry in the security list, determining whether a corresponding physical field exists in the physical data that is specific to the given user; and
        b) if not, removing the entry of the logical field definition in the security list;
    receiving a query issued against a database by the given user, wherein the query is configured with at least one logical field and an associated value for the at least one logical field, wherein the at least one logical field has a corresponding logical field definition in the data abstraction model;
    accessing the security list to determine whether the security list contains an entry corresponding to the at least one logical field of the query; and
    if the security list contains an entry corresponding to the at least one logical field of the query, enforcing a security rule associated with the at least one logical field;
    whereby security rules specified for logical fields in queries are enforced based upon the existence of data specific to the user for the logical fields.

* * * * *